United States Patent [19]

Russell et al.

[11] Patent Number: 4,687,792

[45] Date of Patent: Aug. 18, 1987

[54] ERODIBLE SHIP-BOTTOM PAINTS FOR CONTROL OF MARINE FOULING

[75] Inventors: David B. Russell, Piscataway; Melvin H. Gitlitz, Edison; Howard H. Leiner, Cranbury; Mo A. Khuddus, Matawan; Abe Berger, Summit, all of N.J.

[73] Assignee: M&T Chemicals Inc., Woodbridge, N.J.

[21] Appl. No.: 695,985

[22] Filed: Jan. 29, 1985

Related U.S. Application Data

[60] Division of Ser. No. 619,167, Jan. 17, 1984, Pat. No. 4,594,365, which is a continuation-in-part of Ser. No. 458,377, Jan. 17, 1983, abandoned.

[51] Int. Cl.$^4$ .................. C08L 31/00; C08L 31/02; C09D 5/14

[52] U.S. Cl. .................. 523/177; 523/122; 524/178; 106/16; 106/18.23; 106/18.35

[58] Field of Search .................. 523/177, 122; 106/16, 106/18.23, 18.35; 524/178

[56] References Cited

U.S. PATENT DOCUMENTS 4,052,354  10/1977  Beiter et al. .................. 523/122

Primary Examiner—John Kight
Assistant Examiner—M. L. Moore
Attorney, Agent, or Firm—S. H. Parker; J. Matalon; R. Bright

[57] ABSTRACT

A novel polymeric binder for use in an antifouling paint includes an acrylic or methacrylic ester monomer having selected substituted aryl or arylalkyl substituent groups in the ester moiety so that the ester is hydrolyzable at a suitable rate in seawater, and a copolymerizable ethylenically unsaturated monomer unit.

14 Claims, No Drawings

ERODIBLE SHIP-BOTTOM PAINTS FOR CONTROL OF MARINE FOULING

CROSS REFERENCE OF RELATED APPLICATIONS

This application is a divisional application of application Ser. No. 619,167, filed Jan. 17, 1984, now U.S. Pat. No. 4,594,365 which, in turn, is a continuation-in-part of application Ser. No. 458,377, filed Jan. 17, 1983, and now abandoned.

FIELD OF THE INVENTION

This invention relates to marine antifouling paints which erode at a predetermined rate, and more particularly to a polymeric binder for an antifouling paint where the polymer includes moieties which hydrolyze at a predetermined rate in the presence of sea water.

BRIEF DESCRIPTION OF THE PRIOR ART

The superiority of antifouling paints based on organotin acrylate polymers over the old, conventional leaching type systems has been established by the major ship owners and marine paint companies. Such paint systems offer superior antifouling performance over extended periods because of a constant release of toxicant from the surface of the paint film by hydrolysis of the organotin acrylate copolymer in seawater, normally slightly alkaline.

In paint systems of this kind, the organotin acrylate copolymer serves as the film-forming component (binder).

The organotin portion of the copolymer provides a site for hydrolysis of the polymer by seawater (app. pH=8.0 to 8.3), by which process the polymer surface is slowly converted to a water-soluble or water-swellable form which is able to be eroded away by moving seawater and expose a fresh paint surface.

In addition, the hydrolysis of the organotin polymer releases bis-tributyltin oxide, an effective antifouling toxicant.

In practice, additional toxicants are usually physically incorporated into the antifouling paint. These cotoxicants are released during the gradual hydrolysis and erosion of the organotin copolymer vehicle and serve to provide additional protection against fouling. An additional advantage claimed for such systems is fuel savings which results from a reduction in surface roughness as a consequence of water-planing or erosion of the paint film. Such systems can be designed to hydrolyze and erode at high or low rates by incorporating a retarder characterized by having a low seawater solubility as described in Milne and Hails, U.S. Pat. No. 4,021,392. Milne and Hails also claim that a commercial paint cannot be formulated solely by adjusting the organotin monomer content in the organotin copolymer.

The mechanism by which organotin copolymer antifouling paints function is described in *Journal of Coatings Technology*, Vol. 53, Number 678, pages 46–52. Such paints, however, are relatively expensive and possess undesirable irritative properties due to the necessary presence of the hydrolyzable tributyltin moiety.

These paints represent a major improvement over the conventional, leaching-type paints wherein the cuprous oxide toxicant is dispersed in a binder consisting of a mixture of a film-forming insoluble resin and water sensitive or slowly water-soluble component such as gum rosin. An example of such a "soluble matrix" paint formulation is given in Table A.

TABLE A

Soluble Matrix Copper Oxide Antifouling Paint
U.S. Navy 121/63 Formula

| Ingredient | Pounds | Gallons |
| --- | --- | --- |
| Cuprous oxide | 1440 | 50.0 |
| Rosin | 215 | 24.1 |
| Vinyl resin (VYHH)[a] | 55 | 4.7 |
| Tricresyl phosphate | 50 | 11.7 |
| Xylene | 115 | 16.1 |
| MIBK | 165 | 24.7 |
| Antisettling agent | 7 | 1.0 |
| 1:4 Resin:Rosin Ratio | | |

[a]Union Carbide

Such paint systems, however, fail to provide a constant toxicant release, and moreover, do not erode in service. This is due to the selective extraction of the water-soluble component and consequent leaching of toxicant (cuprous oxide) from the interior of the paint film. A matrix of the insoluble vinyl resin component remains behind after the water-soluble component of the film (gum rosin) is leached away. Moreover, the spent paint film no longer controls fouling even though it might contain up to 30–40% of the initial level of cuprous oxide because water penetration required for leaching the copper to the surface is limited through the matrix of residual vinyl resin. Spent antifouling systems of this type do not provide a suitable base for repainting since they possess poor mechanical properties due to the voids in the film which result in poor adhesion of the new paint film.

Prior art attempts to incorporate toxicants into water soluble polymers and to use these as antifouling paints have also failed to produce the desired results. Such paints swell in seawater and cannot be expected to provide good mechanical properties and uniform control of fouling since the whole paint film is weakened on prolonged water immersion. Even such paint compositions as described in British Patent Specification No. 1,584,943 do not provide optimum control of fouling because the paint binder consists of a physical mixture of water insoluble and synthetic water-soluble polymeric binders wherein the synthetic water-soluble polymeric binder is substituted for the natural gum rosin of the previously described paint system. In the paint systems of British Patent Specification No. 1,584,943, the water-soluble polymeric component can be selectively extracted from the binder system by seawater leading to the same problems encountered with traditional vinyl/rosin systems. Moreover, on prolonged immersion in water, some portion of the water-soluble resin component can cause the film to absorb water and swell through out its thickness yielding a film with poor mechanical properties.

Simple acrylate ester copolymers are proposed as vehicles for paints which are gradually planed away by moving seawater in U.S. Pat. No. 4,407,997, published May 26, 1982. However, for such paints to surface erode, a major proportion of the pigment used must be a water-sensitive metalliferous pigment. In addition, such coatings must contain from 35–50% by volume of pigment with the higher levels being preferred. Highly insoluble pigments retard the dissolution of the paint film and must be kept below certain specified levels. It is thus evident that the pigment content is being dictated by the required dissolution rate. The ability of the pigment content to control dissolution is claimed to be improved by the use of low molecular weight polymer as the paint binder as well as by the incorporation of hydrolyzable tributyltin acrylate groups into the polymer chain. These facts are consistent with the known water resistance of poly (methyl acrylate) films which as described in Kirk-Othmer Encyclopedia of Polymer Science and Technology (Vol. 1, pages 246–328, 1964), are only slightly attacked even by strong aqueous solutions of sodium hydroxide or sulfuric acid at room temperature. Thus, those paints described in British Patent Application No. 2,087,415A are much less dependent on the nature of the polymeric binder than on the high levels of watersensitive pigments present. These pigments can be leached out by sea-water and the resulting empty matrix film, now devoid of reinforcing pigment particles, can be sufficiently weakened to be planed away by moving seawater. This method for protecting against surface growth is similar to the method by which chalking or self-cleaning mildew-resistant exterior house paints are obtained by the incorporation of zinc oxide and hydrophilic anatase titanium dioxide into paints based on acrylic or polyvinyl acetate resin polymers as described in *J. Paint Technology*, Vol. 46, No. 594 (July 1974), page 33. Such paints would be expected to have poor mechanical properties such as would make them unsuitable for underwater use for prolonged periods of time.

Further background is found in European patent application No. 0069559, published Jan. 12, 1983, which discloses that although triorganotins are effective antifouling agents, they are expensive to employ and there are some circumstances where the release of triorganotin ions is preferably avoided or reduced while still obtaining the benefits of smoothing of the paint in service by an erosion mechanism. The patent application discloses the substitution of quinolinyl (or substituted quinolinyl) groups for the organotin groups in acrylate copolymers. The approach of this disclosure replaces one expensive toxicant with another but fails to provide a means for controlling the erosion rate which is independent of the toxicant concentration.

SUMMARY OF THE INVENTION

The instant invention overcomes the problems of the prior art by means of the controlled tailoring of an optimum paint binder system and the concommitant achievement of optimum erosion rate and optimum paint formulation. In accordance with the present invention, a paint is provided which is produced from a binder polymer resulting from the copolymerization of one or more copolymerizable ethylenically unsaturated monomers and a monomer having a functional group which produces a polymer which is hydrolyzable in seawater.

In accordance with the present invention an antifouling paint is provided which includes a toxicant, a pigment and a polymer binder. The polymeric binder is film-forming, water insoluble, seawater erodible and is represented in one embodiment by the formula

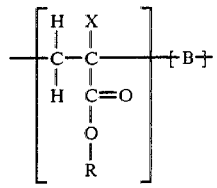

wherein
X is H or $CH_3$;
R is a substantially non-bioactive, alkyl, aryl or arylalkyl moiety;
and recurring groups B, where B is the residue of an ethylenically unsaturated monomer.

The polymer has a hydrolysis rate of at least $5 \times 10^{-4}$ milliequivalents per hour. The resultant paint has an erosion rate of at least 2 microns per month.

R can be selected from the group consisting of:
(a)

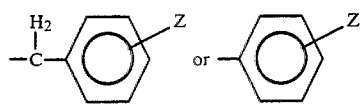

wherein
Z is $NO_2$, halogen or CN;
(b)

wherein
n is an integer from 1 to 4; and
Y is selected from the group consisting of

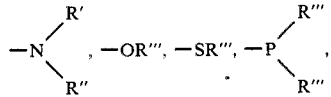

and wherein
R' is $C_1$ to $C_4$ primary, secondary or tertiary alkyl,
R'' is H or R';
R''' is alkyl or an aryl;
(c) can be —SiR''' or —Si(OR''')₃;
(d) R can be a halo alkyl group having at least one trihalomethyl group where the halogen is Br, F, Cl, and the alkyl has at least two carbons, e.g. trifluoroethyl acrylate;
(e) a quaternized amino alkyl represented by the formula

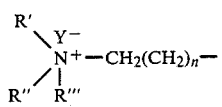

where Y is Br, Cl or I,
R', R'' and R''' are the same or different $C_1$ to $C_{18}$ alkyls; and
(f)

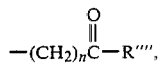

wherein n is 1 or 2;
R'''' is a phenyl group or a $C_1$ to $C_4$ primary, secondary or tertiary alkyl.

In another embodiment
X is halogen, CN, or $NO_2$, and
R is $C_1$ to $C_8$ primary, secondary or tertiary alkyl.

The polymer of the present invention, can serve entirely as a toxicant delivery system, and is not dependent upon the hydrolysis of an organotin or bioactive component containing polymer. Thus, any effective antifoulant can be incorporated into the paint.

DETAILED DESCRIPTION OF THE INVENTION INCLUDING THE PREFERRED EMBODIMENTS

Superior control of fouling on shipbottoms is achieved by the use of coatings based on polymers which slowly hydrolyze in seawater and an inorganic or organic toxicant which is slowly released as the organic polymeric binder is hydrolyzed. The paint is produced from a binder polymer resulting from the copolymerization of (1) at least one acrylic or methacrylic ester having a functional group which produces a polymer which is hydrolyzable in seawater and (2) one or more copolymerizable ethylenically unsaturated monomer.

It can be shown that conventional acrylate esters, e.g., ethyl acrylate, methyl methacrylate and butyl acrylate do not hydrolyze at a sufficient rate to be used in achieving a carboxylate containing polymer, which is sufficiently sensitive to erosion by the action of seawater, to produce an antifouling paint.

However, it is possible to modify the ester to produce enhanced hydrolytic sensitivity of the polymer. This can be accomplished by providing a functional group which assists or enhances the attack by hydroxyl ions or by weakening the ester bond.

In a monomer represented by the formula

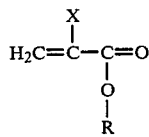

R can be

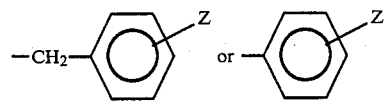

wherein
Z is $NO_2$, halogen or CN.
An example is p-nitrophenyl acrylate.
R can also be represented by the formula:

$-(CH_2)_nY$ wherein
n is an integer from 1 to 4; and
Y is selected from the group consisting of

as for example dimethylaminoethyl methacrylate;
—OR''', as for example methoxyethyl acrylate;
—SR''', as for example methylthioethyl acrylate; and p-aminophenylthioethyl acrylate; and

as for example diphenyl phosphinoethyl acrylate; and
wherein
R' is $C_1$ and $C_4$ primary, secondary or tertiary alkyl,
R'' is H or R';
R''' is alkyl or an aryl.

It should be understood that references to alkyls, aryls and the like is intended to include substituted alkyls aryls, etc.

R can also be —SiR'''$_3$ or —Si(OR''')$_3$, where R''' is an alkyl or an aryl, as for example triphenylsilyl acrylate.

R can also be a quaternized aminoalkyl represented by the formula

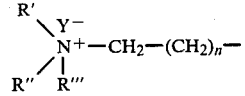

where
Y is Br, Cl or I;
R', R'' and R''' are the same of different $C_1$ to $C_{18}$ alkyls.

In another embodiment R is a haloalkyl having at least one trihalomethyl group, where the halogen is Br, F or Cl and the alkyl has at least two carbons, as for example trifluoroethyl acrylate. Typical of the haloalkyl alcohols are the compounds described in DuPont Zonyl$^R$ Flouorosurfactants Product Information Bulletin 8/82.

R can also be a tertiary alkyl group having four or five carbons. It should be noted that the term alkyl as employed herein is intended to be understood to the generic term which is inclusive, for example, of linear, branched, cyclo and substituted alkyls.

R can also be

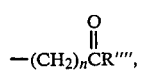

where n is 1 or 2 and R'''' is a phenyl group or a $C_1$ to $C_4$ primary, secondary or tertiary alkyl, as for example, 2-oxopropyl methacrylate or 4-phenyl-3-oxobutyl acrylate.

In another embodiment of the invention, R is a $C_1$ to $C_8$ primary, secondary or tertiary alkyl and X is halogen, CN or $NO_2$, as for example, 2-ethylhexyl chloroacrylate.

It should be noted that reference to the monomer is not intended to indicate that the polymer must be synthesized by copolymerization of a particular monomer with a comonomer. For example, the polymer can be produced by adduct ion to a preformed acrylic or methacrylic acid polymer. The resultant polymer will include a recurring group represented by the structure

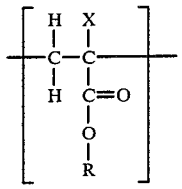

and the recurring group will correspond to a monomer

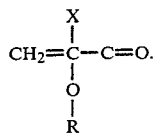

The paint formulation includes the polymeric binder, a solvent, a toxicant and can include a water sensitive pigment component, which can be a toxicant, inert pigments and fillers along with a retarder. U.S. Pat. No. 4,260,535, British No. 2,087,415A and U.S. Pat. No. 4,191,579 are noted to contain descriptions of typical paint components and are incorporated by reference.

Antifouling toxicants include tributyltin fluoride, triphenyltin hydroxide, triphenyltin fluoride, tributyltin oxide, triphenyltin chloride, $Cu_2O$, $ZnO$, dithiocarbamate derivatives and cuprous thiocyanate.

The paint formulation employs sufficient solvent to enable the system to be applied to the surface to be protected. The pigment volume concentration (PVC) should be in the 10 to 50 range, and preferably is from about 30 to 45.

The upper limit for the hydrolysis of the polymer used in the paint is not of critical importance because even with an excessively rapidly hydrolyzing polymer, a desired erosion rate can be achieved by proper selection of the ratio of functional group to polymer or copolymer or the use of a retarder as disclosed in U.S. Pat. Nos. 4,021,392; 4,260,535; and British Pat. No. 1,589,246, the disclosures of which are incporated herein by reference.

The erosion rate of the paint is dependent upon the total contributions of the functional group, the comonomer and other components, such as toxicant(s), pigment(s), retarder(s), fillers, inerts or other non-volatile components of the paint.

The functional group of the present invention can work in conjunction with known erosion rate controls or in place of known means to regulate the erosion rate.

The amount of the hydrolyzable acrylate or methacrylate to non-hydrolyzing, ethylenically-unsaturated comonomer, on a mole basis, in 100 parts of the copolymer, is from 10 to 90 parts. In the case of the acrylic or methacrylic ester of an amino or quaternized amino alkyl alcohol from 10 to 100 parts; in the case of an acrylic or methacrylic ester of haloalkyl alcohols, from 10 to 80 parts; in the case of nitrophenol or nitrobenzyl alcohol ester and 10 to 80 parts in the case of trialkyl, triaryl or trialkoxy silanol esters 10–80 parts.

The ethylenically unsaturated comonomers are well known in the film forming art and are identified for example, in British No. 2,087,415A, page 1, lines 56 to 59, and U.S. Pat. No. 4,021,392, column 4, lines 33 to 41, the disclosures of which are incorporated by reference.

The superior control of the erosion rate relies on chemically tailoring the polymer so that it is selectively weakened at certain points pendant to the polymer chain at the paint/water interface. These weak links are slowly attacked by seawater allowing the polymer to gradually become seawater soluble or seawater swellable. This weakens the hydrolyzed surface polymer film to such an extent that moving sea-water is able to wash off this layer and thus expose a fresh surface. By way of contrast with the prior art systems, in the system of the present invention the paint is relatively impermeable to seawater until hydrolysis of the outer microlayer takes place. The hydrolyzed microlayer is then sequentially removed by the water "friction".

A portion of the monomeric units are provided with functional groups which provide a site of weakness, that is, sites which tend to hydrolyze in the presence of seawater. The ratio of functionalized monomers to non-functionalized monomers is controlled to provide control of the erosion rate. Thus, unlike the system of the British Patent Application No. 2,087,415A which relies on the presence of high levels of water-sensitive pigments to provide erosion, the system of the instant invention is controlled by the levels and ratio of functional and inert monomers used to prepare the polymer.

POLYMER PREPARATION

The solution polymerization of a 70 mole percent dimethylaminoethyl methacrylate (DMAEMA) polymer is carried out as follows:

| Ingredients | Charge (parts) |
| --- | --- |
| DMAEMA | 36.9 |
| Butyl methacrylate (BMA) | 9.5 |
| Methyl Methacrylate (MMA) | 3.35 |
| Vazo 64[1] | 0.25 |
| High Flash Naphtha[2] | 50.0 |
| | 100.0 |

[1] DuPont's azo bis isobutyronitrile polymerization initiator.
[2] Amsco Solvents - can use xylene as replacement.

Procedure (1) charge all ingredients to a glass four neck resin reactor containing a stainless steel stirrer, condensor, nitrogen inlet, a thermometer with a temperature sensing-controlling head attached, and a glas-col heater.

(2) under a nitrogen atmosphere, heat to 80° C. in 1 hour, hold for 6 hours, cool to below 30° C., package.

The modifications necessary to produce other polymers are made in accordance with procedures well known in the art and do not form a part of the present invention.

| Representative Polymer Compositions varied mole % hydrolysis-inducing monomer, methyl balance methacrylate and/or butyl methacrylate. | | |
| --- | --- | --- |
| Run | Mole % | Active Monomer |
| 1 | 70 | trifluoroethyl acrylate (TFEA) |
| 2 | 70 | t-butyl acrylate (TBA) |
| 3 | 70 | dimethylaminoethyl methacrylate (DMAEMA) |
| 4 | 70 | t-butylaminoethyl methacrylate (TBAEMA) |

Representative Polymer Compositions
varied mole % hydrolysis-inducing monomer, methyl methacrylate and/or butyl methacrylate. balance

| Run | Mole % | Active Monomer | |
|---|---|---|---|
| 5 | 26 | DMAEMA/$C_{14}$ $Br^-$ | (Quat) |
| 6 (control) | 70/30 | Butyl methacrylate/methyl methacrylate | (BMA) |
| 7 | 70 | trifluroethyl methacrylate | (TFEMA) |
| 8 | 15 | Quat + DMAEMA (20 mole %) | |
| 9 | 35 | Quat | |
| 10 | 70 | p-nitrophenyl acrylate | (NPA) |
| 11 | 70 | p-nitrobenzyl acrylate | (NBA) |

SYNTHESIS PROCEDURE FOR FUNCTIONAL ACRYLATE AND METHACRYLATE ESTERS FROM ACRYLOYL CHLORIDE OR METHACRYLOYL CHLORIDE AND THE FUNCTIONAL ALCOHOL

The general procedure for the synthesis of the functional acrylate and methacrylate esters is shown in the following example.

Method A

Synthesis of p-Nitrobenzyl Acrylate 153.1 g (1 mole) p-nitrobenzyl alcohol, 101.2 g (1 mole) triethylamine and 250 ml of molecular sieve-dried acetone were placed in a 1 liter 3-necked flask, fitted with a stirrer, condenser, thermometer and dropping funnel, and cooled in an ice-water-acetone bath to below 5° C. 905. g (1 mole) acryloyl chloride in 100 ml of dry acetone was slowly added to the contents of the flask at 0°–5° C., stirred for an additional hour, then heated to reflux (60° C.) and held at reflux for 4 hours. The trimethylammonium hydrochloride was removed by vacuum filtration and the acetone was removed on a rotary evaporator. The solid product was dissolved in 150 ml of warm methanol from which it crystallized on cooling. The yield was 45.0 g (53%) of white crystals, mp=50.0°–50.9° C. 98% assay via iodine number titration. Chromotography showed a single component.

From the reaction of 52.3 g (0.5 m) methacryloyl chloride and 76.6 g (0.5 m) of p-nitrobenzyl alcohol and 50.6 g triethylamine was isolated 71.5 g (64.5%) of p-nitrobenzyl methacrylate as pale-yellow crystals, mp—87°–88° C.

In a similar manner, trichloroethyl acrylate was prepared from 149.4 g (1 mole) trichloroethanol and acryloyl chloride (99.5 g, 1.1 mole). The washed and solvent-stripped crude product was vacuum distilled at 41°–44° C. and 0.7 mm Hg to give 69.3% of colorless liquid. NMR showed a product with 76% purity, the remainder being trichloroethanol, see Table 1 for details.

TABLE 1

METHOD A. PREPARATION OF ACRYLIC MONOMERS BY TRANSESTERIFICATION

| Product | M. Wt. | Boiling Point Temp °C. | mm/Hg | % Yield (Distilled) | G.C. Purity | Refractive Index | Saponification No. | Iodine No. | $N_2$ No. |
|---|---|---|---|---|---|---|---|---|---|
| DMAPA | 157.3 | 64 | 6 mm | 57 | 98.3 | 1.4384 | | 160 (161) | 8.76 (8.9) |
| MEA | 130.1 | 51 | 8 mm | 56 | 99.8 | | 435.3 (431.5) | 193 (195) | |
| MTEA | 146.2 | 68 | 6 mm | 65 | 99.1 | 1.4810 | 392.3 (384.2) | 195 | |
| DMAHA | 199.1 | 62 | 4 mm | 90 | 99.0 | 1.4457 | | 129 (127.6) | 6.95 (7.0) |
| DBABA | 171.3 | 72–84 | 6 mm | 70 | 93.0 | 1.4406 | | 140 (138) | 8.24 (8.1) |

( ) = Theory

Method B

Preparation of Acrylic Monomers for Transesterification 2.5 moles of methyl acrylate, 1 mole of corresponding alcohol, 2 g of Phenothiazine as polymerization inhibitor and 3.6 g of dioctyltin oxide as catalyst were placed in a three necked flask equipped with a stirrer, a thermometer and a distillation column packed with glass beads and the condenser and received. The mixture was heated at a temperature range of 75°–96° C. and the methanol-methyl acrylate azeotropic mixture being distilled in the range of 64°–80° C. As methyl acrylate is co-distilled with methanol, virgin methyl acrylate is added to compensate for total distillate off. After 10 hours, the transesterification was completed when the temperature of reaction liquid reached 96° C., the resulting mixture was distilled under pressure of 4–8 mm Hg to distill off unreacted methyl acrylate and then product. The analysis of the resulting product by the infrared absorption spectrum method (IR method), the gas chromatography (GC method) and the nuclear magnetic resonance spectrum method (NMR method) confirmed the structure of the product.

Method C

Preparation of Tris (4-Methyl-2-Pentoxy)Silyl Acrylate 0.23 moles of tris(4-methyl-2pentoxy)silanol, 0.23 moles of triethylamine, 0.02 gms. of methyl hydroquinone as polymerization inhibitor and 82 cc of toluene were placed in a three necked flask equipped with a stirrer, addition funnel, a thermometer and a condenser. A solution of 0.23 moles of acryloyl chloride in 23 cc of toluene was added slowly to the reaction mixture at 3°–5° C. At the end of the addition, the mass is allowed to stir for ½ hour at 5° C. The solid triethylamine hydrochloride was filtered and the solvent was distilled under vacuum. The residual crude product was distilled (bp 148°–162° C./3 mm/Hg) to give 41 gms. of product (G.C. purity 80%).

ANTIFOULING PAINTS

Paints containing low and high levels of cuprous oxide, an accepted antifoulant and based on representative hydrolyzable polymers exhibiting suitable hydrolysis rates were prepared and tested for fouling resistance.

The test paint compositions and method of preparation are described below.

| Ingredient | grams/1500 ml paint |
|---|---|
| Test Paint A Composition | |
| Xylene | 322.4 |
| Fumed Silica | 32.0 |
| Methanol | 5.8 |
| tributyltin methacrylate polymer[1] (50% solution in xylene) | 409.6 |
| Zinc Oxide | 679.2 |
| Organic Pigment[2] | 32.3 |
| Methyl Isobutyl Ketone | 118.1 |
| Test Paint B Composition | |
| Xylene | 260.7 |
| Fumed Silica | 29.7 |
| tributyltin methacrylate polymer[1] (50% solution in xylene) | 724.2 |
| Paint Stabilizer[3] | 30.0 |
| Cuprous Oxide | 1173.9 |
| Dispersing Aid[4] | 3.0 |
| Methyl Isobutyl Ketone | 31.5 |

[1] M & T Chemicals Inc., Rahway, N.J., other functional acrylate or methacrylate copolymers described herein replace the tributyltin methacrylate (TBTM) polymer on an equal volume solids basis.
[2] A-2989 Toluidine Toner, Ciba-Geigy, Ardsley, N.Y.
[3] Viscostab, M & T Chemicals Inc., Rahway, N.J.
[4] Zonyl FSP, Dupont Co., Wilmington, Delaware

Test Paint A Preparation

The fumed silica is dispersed in xylene with a moderate speed dispersator (Cowles-type). The methanol is added while stirring, followed slowly by half of the polymer solution. All the pigments are then added with moderate agitation and the resultant paste is ground in a water-cooled steel shot mill. The mill is washed with a mixture of the ketone and the remainder of the polymer solution and the washings are added into the paste. The entire paint is mixed and passed through the mill once more. The paint should be at a fineness of grind of 4–6 (Hegman gauge). The paint may be adjusted for a final viscosity of 1,000 to 1,500 cps with solvent.

Test Paint B Preparation

The fumed silica is dispersed in xylene with a moderate speed dispersator (Cowles-type). One half of the polymer solution and one half of the paint stabilizer are slowly added, followed by the dispersing aid and the cuprous oxide. The resultant paste is ground in a water-cooled shot mill. The mill is washed with a mixture of the ketone and the remainder of the polymer solution and the stabilizer into the paste. The well-mixed paint is passed through the shot mill once more and checked for a desired fineness of grind (Hegman gauge) of 4–6. The paint is adjusted for a final viscosity of 1,000 to 1,500 cps (Brookfield) with solvent.

It should be evident from the foregoing descriptions and examples, that the toxicant delivery system of the invention is capable of delivering toxicant at a substantially constant rate over the required time period. Moreover, the delivery rate is independent of the solubility characteristics of the toxicant, and consequently the minimum marine fouling prevention quantity of toxicant can be employed in the system. The avoidance of the requirement for excess toxicant can produce a significant cost savings, as compared to a system in which excess toxicant is used because of a non-uniform toxicant delivery rate and/or a need to optimize the hydrolysis rate of the system. As used herein, the term polymer hydrolysis rate refers to rate of production of carboxylic ions by 5 g of powdered polymer film. The availability of carboxylic ions is dependent upon the concentration of the functional group in the polymer. The toxicant release rate can thus be customized, based on the polymer dissolution rate.

Procedure for Measuring the Rate of Hydrolysis of Ground Polymer Films

The polymer hydrolysis rate is determined in accordance with the following procedure.

The hydrolysis of polymer films in pH=9 water at 35° C. was measured by back titrating the polymer free acid with standardized KOH at 24 hour intervals using the procedure described below:

Hydrolyses were conducted in a single neck, 300 ml Florence flask, stirred by a ¾" Teflon coated magnetic stirrer, immersed in a thermostatically-controlled water bath at 35°+1° C. under an inert atmosphere obtained by bubbling nitrogen below the surface of the resin-water mixture for about one half hour then sealing the flask. The flask contained 150 ml of distilled water at a pH of 9.0 with KOH and 5.0 g of vacuum dried polymer film pulverized in a Waring blender for 20–30 seconds. The pH was measured on an Orion model 601A Digital Ionalyzer pH Meter using a combination glass/KCL electrode. Every 24 hours the contents of the flasks were back-titrated to pH 9.0 with standardized KOH and the number of milliequivalents used was calculated. The test was either terminated five consecutive 24-hour titrations.

The following Table shows the results of the polymer hydrolysis test. Polymers which show hydrolysis rates above $5 \times 10^{-4}$ meq/hr are capable of serving as binders for water-insoluble sea-water erodible antifouling paints. It should be noted that the test indirectly confirms the efficacy of state-of-the-art tributyltin copolymers since even at a 33 mole % level this copolymer hydrolyzed at a rate which would indicate suitability as an antifouling paint binder.

| HYDROLYSIS OF FUNCTIONAL MONOMER-BASED ACRYLIC POLYMERS AT 35° C. IN pH 9 MEDIUM | | |
|---|---|---|
| Monomer | Mole % in Polymer | meq. Base ($10^2$) Consumed After 120 Hours |
| Benzyl methacrylate | 100 | 6 |
| Butyl methacrylate/ methyl methacrylate | 50/50 | 2 |
| TBTM | 33 | 9 |
| DMAEMA | 70 | 17 |
| " | 50 | 12 |
| t-BAEMA | 70 | 36 |
| " | 50 | 13 |
| Quarternized DMAEMA | 50 | 56 |
| p-Nitrobenzyl acrylate | 70 | 58 |
| p-Nitrophenyl acrylate | 70 | 27 |
| Hexafluoroisopropyl acrylate | 50 | 12 |
| Trifluoroethyl acrylate | 50 | 15 |
| methyl α-chloroacrylate | 70 | 10 |
| Trichloroethyl acrylate | 70 | 4 |

The utility and novelty of the paint systems lies in the recognition that the bulk of the paint is water insoluble and only the surface of the film, which is in contact with seawater hydrolyzes and thereby is slowly converted to a water-soluble or water-swellable form. This layer can be eroded away by moving seawater, releasing the physically bound toxicant to prevent fouling and exposing a fresh paint surface. With this mechanism, the hydrolysis of the polymer and the rate at which the hydrolysis proceeds governs the ability of the paint film to erode and control fouling. This rate of hydrolysis can be measured under conditions which simulate the action of moving seawater.

EVALUATION METHOD—AF COATINGS

Panel Preparation—Fiberglass panels (8"×10") were solvent stripped, then sanded to insure adhesion of the coatings.

Paint was applied in the center of the panels to a dry film thickness of approximately 100 microns with a draw down blade applicator. The outer edges were uncoated and provided a measure of the total fouling challenge.

Panel Exposure—The panels were suspended from rafts in Biscayne Bay, Fla. The submerged racks hold 8 panels, 1 foot below the surface-with 2 inches of space between panels.

Fouling Rating (FR)—Fouling is rated as follows:
0=no fouling
+ =very slight fouling
+ + =moderate fouling
+ + + =heavy fouling
+ + + + =completed fouled.

After three months testing in Biscayne Bay, Fla., the following results were observed from test paint A formulations incorporating relatively low levels of the functional monomers in the binder polymer. See Tables 2 and 3.

The static panel results on the antifouling paints prepared with relatively low levels of tin free functional acrylic polymers show varying degrees of effectiveness in providing control of marine fouling following three months' exposure.

Of the paints based on functional monomers, paint no. 2-5 is by far the most effective with complete control of barnacles and algae. Paint systems based on DMAEMA (Paint No. 2-1), tBAEMA (No. 2-8) and TFEA (No. 2-9) are effective against barnacles but poor in providing control of algae, suggesting that the aproper release rate of copper has not yet been achieved in these systems. Paint system No. 2-4 is somewhat effective against barnacles and algae at the three month exposure time. Most of the paints, compare favorably with the commercial tributyltin polymer paint (No. 2-2) in antifouling activity after 3 months but all except the tributyltin and quarternzied polymers showed a dramatic decrease in activity after 6 months testing in Miami indicating that these systems have insufficient hydrolysis and erosion rate for practical purposes.

TABLE 3

Miami Exposure Results - Test Paint A

| Panel No. | Paint Type | Functional Monomer | Mole % in Polymer | Fouling Rate FR 1 Mo. | 3 Mo. | 6 Mo. |
|---|---|---|---|---|---|---|
| 3-2 | A | DMAEMA | 50 | 0 | + | + |
| 3-5 | A | DMAEMA | 70 | 0 | + | + |
| 3-4 | A | t-BAEMA | 50 | 0 | + | + |
| 3-7 | A | t-BAEMA | 70 | 0 | + | + |
| 5-1 | A | NE Control[1] | — | + | + + + + | + + + |

[1]Non-Eroding Control based on methyl methacrylate

TABLE 4

Miami Exposure Results - Test Paint B

| Panel No. | Paint Type | Functional Monomer | Mole % in Polymer | Fouling Rate FR 1 Mo. | 3 Mo. |
|---|---|---|---|---|---|
| 9-9 | B | DMAEMA | 55 | 0 | + |
| 9-7 | B | DMAEMA | 60 | 0 | + |
| 9-5 | B | DMAEMA | 65 | 0 | + |
| 9-3 | B | DMAEMA | 70 | 0 | + |
| 10-2 | B | DMAEMA/TBAEMA | 35/35 | 0 | + |
| 9-8 | B | t-BAEMA | 55 | + | + + |
| 9-6 | B | t-BAEMA | 60 | + | + |
| 9-4 | B | t-BAEMA | 65 | 0 | + |
| 9-2 | B | t-BAEMA | 70 | 0 | + |
| 6-2 | B | NE Control[1] | — | + + + | + + + + |

[1]Non-Eroding Control based on methyl methacrylate

These results shown the trend to better performance at the higher levels of functional monomers in the binder polymer. In all cases the test paint performed better than the control which contained nonhdrolyzable binder polymer. This data also confirms that the failure of the paints containing the non-hydrolyzable binder polymers is independent of the level of copper oxide and reflects the fact that in such systems the antifoulant toxicant is not relased from the paint film even on prolonged immersion in sea-water.

| FUNCTIONAL MONOMERS-ABBREVIATIONS | |
|---|---|
| p-nitrophenyl acrylate | PNPA |
| p-nitrobenzyl acrylate | PNBA |
| N,N—dimethylaminoethyl methacrylate | DMAEMA |
| t-butylaminoethyl methacrylate | t-BAEMA |
| hexafluoroisopropyl acrylate | HFIPA |
| 2,2,2-trifluoroethyl acrylate | TFEA |
| methyl α-chloroacrylate | MαCIA |
| hexafluoroisopropyl methacrylate | HFIPMA |
| p-nitrobenzyl methacrylate | PNBMA |
| benzyl methacrylate | BzMA |
| 2,2,2-trichloroethyl acrylate | TCEA |

TABLE 2

Exposure Results - Test Paint A

| Panel No. | Paint No. | Functional Monomer | Mole % in Polymer | 3 Months Fouling Rating FR | Barnacles | Algae | 6 Mo. Fouling Rating FR |
|---|---|---|---|---|---|---|---|
| 4 | 2-1 | DMAEMA | 35 | + | 0 | 2 | + + + |
| 5 | 2-2 | Tributyltin | 33 | 0 | 0 | 0 | 0 |
| 16 | 2-4 | DMAEMA | 25 | + | 2 | 3 | + + + |
| 17 | 2-5 | Quat. | 17.5 | 0 | 0 | 0 | + |
| 27 | 2-8 | t-BAEMA | 25 | + + + | 0 | 80 | + + + |
| 28 | 2-9 | TFEA | 25 | + + | 0 | 30 | + + + + |

These static panel results on the antifouling paints prepared with relatively low levels of tin free functional acrylic polymers show varying degrees of effectiveness in providing control of marine fouling following three months exposure.

Tables 3 and 4 show the results of testing paints with higher levels of the functional monomers in the binder polymer.

| 3-N,N—dimethylaminopropyl acrylate | DMAPA |
|---|---|
| 2-methoxyethyl acrylate | MEA |
| 2-methylthioethyl acrylate | MTEA |
| 6-N,N—dimethylaminohexyl acrylate | DMAHA |
| 4-N,N—dimethylaminobutyl acrylate | DMABA |

-continued

| FUNCTIONAL MONOMERS-ABBREVIATIONS | |
|---|---|
| Tri(4-methyl-2-pentoxy)silyl acrylate | MPSA |
| DMAEMA/$C_{14}$Br | Quat |
| trifluoroethyl methacrylate | TFEMA |
| methoxy methacrylate | MEMA |

What is claimed is:

1. An antifouling paint for protecting marine surfaces, comprising in combination:
   (a) toxicant and
   (b) a film forming water insoluble, seawater erodible polymeric binder having recurring groups represented by the formula

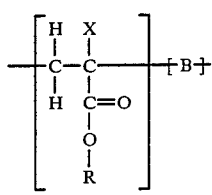

wherein
X is H or $CH_3$;
R is represented by the formula

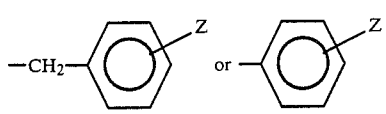

wherein
Z is $NO_2$, halogen or CN, and
where B is the residue of an ethylenically unsaturated monomer, and
wherein said polymer has an hydrolysis rate of at least $5 \times 10^{-4}$ milliequivalents per hour whereby the paint has an erosion rate of at least 2 microns per month in seawater.

2. An antifouling paint according to claim 1 in which R is

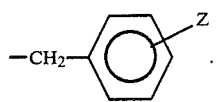

3. An antifouling paint according to claim 1 in which R is

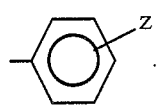

4. An antifouling paint according to claim 1 in which Z is $NO_2$.

5. An antifouling paint according to claim 1 in which Z is halogen.

6. An antifouling paint according to claim 1 in which Z is CN.

7. A method of protecting a marine surface comprising coating said marine surface with the antifouling paint of claim 1.

8. A water insoluble, seawater erodible film forming polymer, said polymeric having recurring groups represented by the formula

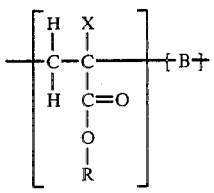

wherein
B is the residue of an ethylenically unsaturated monomer,
X is H or $CH_3$,
R is selected from the group consisting of:

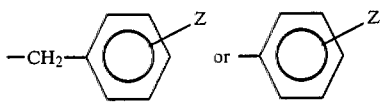

wherein
Z is $NO_2$, halogen or CN.

9. The polymer of claim 8 wherein the polymer has an hydrolysis of at least $5 \times 10^{-4}$ milliequivalents per hour.

10. A polymer according to claim 37 in which R is

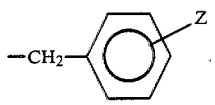

11. A polymer according to claim 8 in which R is

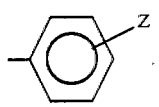

12. An polymer according to claim 8 in which Z is $NO_2$.

13. An polymer according to claim 8 in which Z is halogen.

14. An polymer according to claim 8 in which Z is CN.

* * * * *